United States Patent [19]
Marukawa et al.

[11] Patent Number: 5,900,332
[45] Date of Patent: May 4, 1999

[54] CONNECTION STRUCTURE FOR JOINING BATTERIES

[75] Inventors: Shuhei Marukawa, Toyohashi; Fumihiko Yoshii, Fujisawa; Munehisa Ikoma, Toyohashi, all of Japan

[73] Assignee: Matsushita Electric Industrial, Co. Ltd., Osaka, Japan

[21] Appl. No.: 08/938,376

[22] Filed: Sep. 26, 1997

[30] Foreign Application Priority Data

Sep. 26, 1996 [JP] Japan ................................. 8-254246

[51] Int. Cl.⁶ .................................................. H01M 2/22
[52] U.S. Cl. ......................... 429/158; 429/160; 439/500
[58] Field of Search .................................. 429/158, 160; 439/500

[56] References Cited

U.S. PATENT DOCUMENTS 3,615,867 10/1971 Cich et al. .
3,923,549 12/1975 Mabuchi et al. ..................... 429/158 X

FOREIGN PATENT DOCUMENTS 0 717 453  6/1996  European Pat. Off. .
2 335 962  7/1977  France .
59-224055  12/1984  Japan .
59-224056  12/1984  Japan .
63-105460   5/1988  Japan .

*Primary Examiner*—John S. Maples
*Attorney, Agent, or Firm*—Ratner & Prestia

[57] ABSTRACT

A connector for connecting a first cell and a second cell of a battery in series. Each one of the first cell and second cell has (a) a metal casing as the negative electrode, and (b) a metal electrode installed at one end of the casing, including a first flat portion as the positive electrode. The connector has a side wall capable of fitting the casing inside, and a second flat portion orthogonal to the side wall. A first projection for welding to the electrode member is installed on the second flat portion. A second projection for welding to the casing is installed on an inside surface of the wall. The first projection of the electrode abuts against the first surface of the first cell and are welded together. The side wall of the connector is coupled to the outside of the casing of the first cell, and the second projection of the connector abuts against the surface of the casing of the second cell, and are welded together.

10 Claims, 5 Drawing Sheets

CONNECTION STRUCTURE FOR JOINING BATTERIES

FIELD OF THE INVENTION

The present invention relates to a battery, and more particularly to a connection structure of storage battery module for obtaining a specified output voltage by connecting plural cells in series.

BACKGROUND OF THE INVENTION

A connector for connecting cells is used for forming a storage battery module for obtaining a specified output voltage by connecting cells in series. FIG. 4 is a sectional view showing a connection constitution of cells in the prior art. FIG. 5(*a*) and FIG. 5(*b*) are plan view and side view showing a constitution of a connector in the prior art.

In FIG. 4, a first cell A and a second cell B, respectively, have a metal casing 111 formed cylindrically, and a metal electrode 110 installed at one end, electrically insulated from the metal casing 111. The metal electrode 110 serves also as a positive electrode, and the metal casing 111, as a negative electrode. A bump 114 is set in the center of the metal electrode 110, and a rubber valve 116 is placed in the bump 114 for discharging the gas generated in the cell. By connecting the metal electrode 110 of the first cell A to the metal casing 111 of the second cell B, the first cell A and second cell B are connected in series. This series connection is achieved by welding a connector 115 to the metal electrode 110 and metal casing 111. As shown in FIGS. 5(*a*) and 5(*b*), the connector 115 is formed in a circular disk in two-step depth. An opening 117 is formed in the center of the connector 115 in order to evade the bump 114 of the metal electrode 110. The outer surface of a flat portion 118 of the connector 115 is welded to the metal electrode 110 of the first cell A, and the inner surface of a tubular portion 119 is welded to the metal casing 111 of the second cell B. In this way, plural cells are connected in series, and coupled mechanically, so that a battery module of specified output voltage is composed.

In this conventional constitution, welding of the connector 115 and metal electrode 110 is done by spot welding by feeding welding current between the flat portion 118 of the connector 115 and the metal electrode 110. In this case, one welding electrode is fitted to the flat portion 118, and another welding electrode is fitted to the bump 114 of the metal electrode 110. In ordinary spot welding, welding current is passed by pressing two weld zones between the welding electrodes, and pressed portions are fused and welded.

In the connection battery of the prior art, however, since there is no pressing part, most current flows between the welding electrodes as the surface current of the connector 115 and metal electrode 110. Accordingly, when the connector 115 is made of a thick material or has a small specific resistance, welding is difficult. This state causes a similar problem when the tubular portion 119 is welded to the metal casing 111. That is, in the conventional constitution, when the connector 115 is made of a thick material or has a small specific resistance, the electric resistance of the electric connection between cells becomes large, resulting in increased loss due to large current flow. Moreover, the mechanical strength of the connector 115 is weak and has a low welding strength. Therefore, the strength of the mechanical coupling between the cells is also low. Furthermore, since a welding current flows in the recess 114, the rubber valve 116 placed inside of the bump 114 may deteriorate due to heat generation.

SUMMARY OF THE INVENTION

A connection structure of a battery of the exemplary embodiment of the present invention has a constitution of connecting a first cell and a second cell in series by using a connection member. Each one of the first cell and the second cell has:
- (a) a metal outer member in a container shape installing plural function element members inside, serving as an electrode having one pole, and
- (b) a metal electrode member installed at one end, being electrically insulated from the outer member, including a first flat portion serving as an electrode having another pole.

The connector has a side wall capable of fitting within the outer member, and a second flat portion orthogonal to the side wall. A first projection for welding to the electrode member is installed on the second flat portion, a second projection for welding to the outer member is installed on an inside surface of the wall. The second flat portion of the connector is opposite to the first flat portion of the first cell. The first projection of the electrode member abuts against the first flat portion of the first cell and is welded and joined. The side wall of the connector is fitted to the outside of the outer member of the first cell, and the second projection of the connector abuts against the surface of the outer member of the second cell, and is welded and joined.

Preferably, the outer member has a cylindrical shape, the connector has a cylindrical portion that can be fitted to the outside of the outer member of the cylindrical shape, and the side surface is a side wall of the cylindrical portion.

Preferably, the first projection installed on the connector is composed of a plurality of first projections, and each one of the plurality of first projections is installed in a circular pattern on the second flat portion.

Preferably, the second projection installed on the connector is composed of a plurality of second projections, and each one of the plurality of second projections is installed in a circular pattern on centered on the center of the connection member.

The invention also relates to a connection method of a battery by connecting a plurality of cells in series by using a plurality of connection members. Each one of the plurality of cells has:
- (a) a metal outer member in a container shape installing a plurality of function element members inside, serving as an electrode having one pole, and
- (b) a metal electrode member installed at one end, being electrically insulated from the outer member, including a first flat portion serving as an electrode having an other pole.

Each one of the plurality of connection members has a side wall capable of fitting the outer member inside, and a second flat portion orthogonal to the side wall. A first projection for welding to the electrode member is installed on the second flat portion. A second projection for welding to the outer member is installed on an inside surface of the wall. The method comprising:
- (1) a step of installing the second flat portion of each connector opposite to the first flat portion of a respective one of the plurality of cells, so that the first projection of the electrode member abuts against the first flat portion of the respective one cell,
- (2) a step of welding a first contact portion of the first projection and the first flat portion, by applying a current between the connector and the first flat portion of the respective one cell, (3) a step of fitting the inside of the side wall of the connector to the outside of the outer member of a further respective one of the plurality of cells, so that the second projection of the connector abuts against the surface of the outer member of the further respective cell, and (4) a step of welding a second contact portion of the second projection and the outer member, by applying a current between the connector and the outer member of the further respective cell.

In this constitution, since the flat portion of the connector is welded to the metal electrode of the first cell, and the outer wall of the connector is welded to the casing of the second cell, any material can be used for the connector, regardless of the plate thickness or specific gravity, and the welding strength can be increased. Moreover, since the welding positions of the metal electrode and metal casing are located on plural radii, the current path of the connection is the shortest distance. Therefore, a connection structure of cells having an electric connection with low connection resistance and a coupling having high mechanical strength is realized.

DETAILED DESCRIPTION

Figure 1:
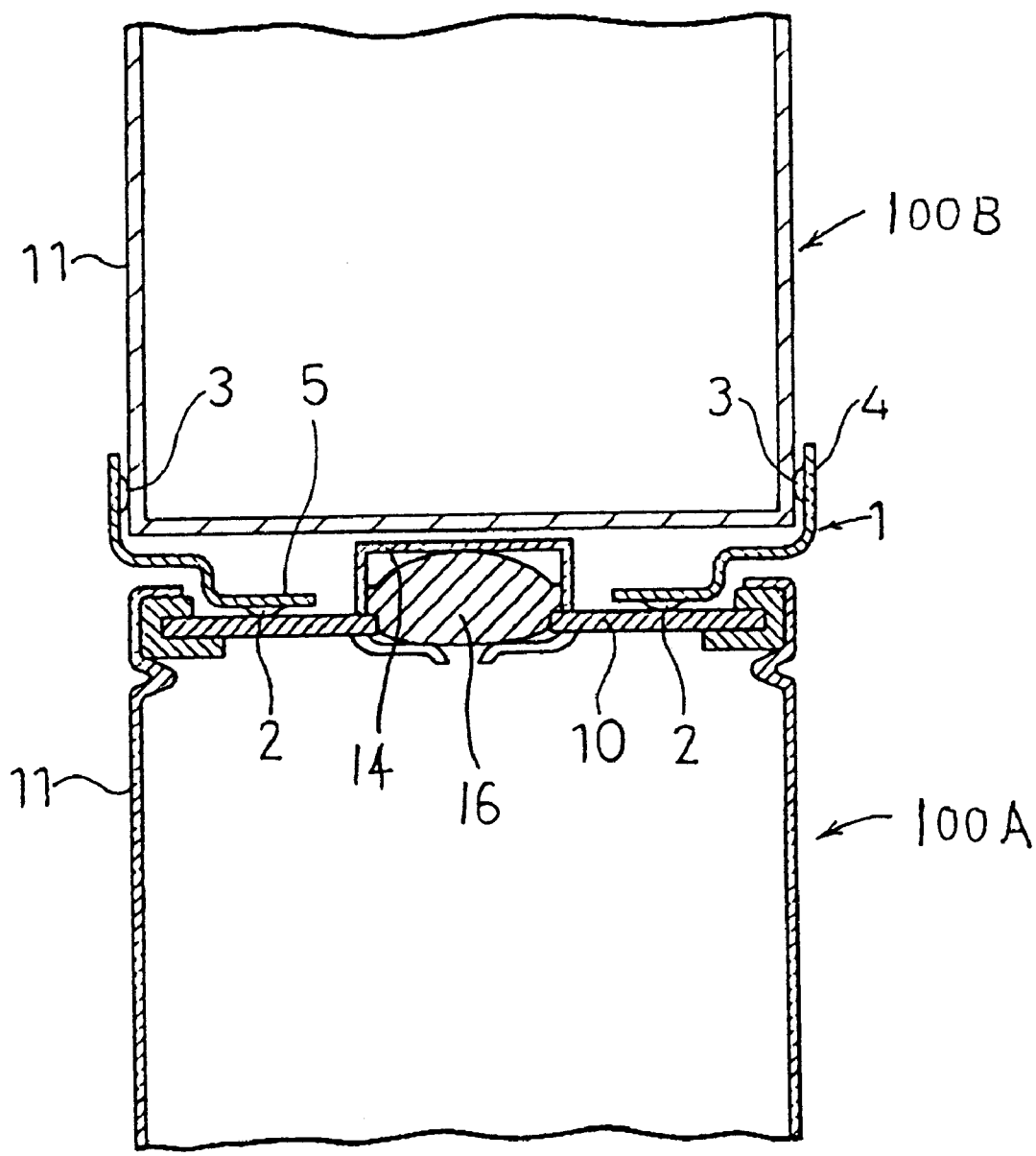
FIG. 1 is a sectional view showing a constitution of a connection structure of a battery according to an exemplary embodiment of the invention.

Referring now to the drawings, a connection structure of a battery in an exemplary embodiment of the invention is described below. The following embodiment is only an example of carrying out the invention, and is not intended to limit the technical scope of the invention.

A sectional view showing a connection constitution of a battery in an exemplary embodiment of the invention is shown in FIG. 1. Plan view, side view, and perspective view of the connector used in the connection structure of the battery shown in FIG. 1 are shown in FIG. 2(a), FIG. 2(b) and FIG. 2(c), respectively.

In FIG. 1, a first cell 100A and a second cell 100B are a circular cylinder of the same type and size. Each one of the cells 100A and 100B has a cylindrical metal casing 11, and a metal electrode 10 installed at one end and electrically insulated from the metal casing 11. The metal electrode 10 also serves as the positive electrode, and the metal casing 11 serves as the negative electrode. A bump 14 is formed in the center of the metal electrode 10, and a rubber valve 16 for discharging the gas generated in the cells is installed inside of the bump 14. The metal electrode 10 of the first cell 100A and the metal casing 11 of the second cell 100B are connected by using a connector 1. Thus, the first cell 100A and second cell 100B are connected in series.

Figure 2A:
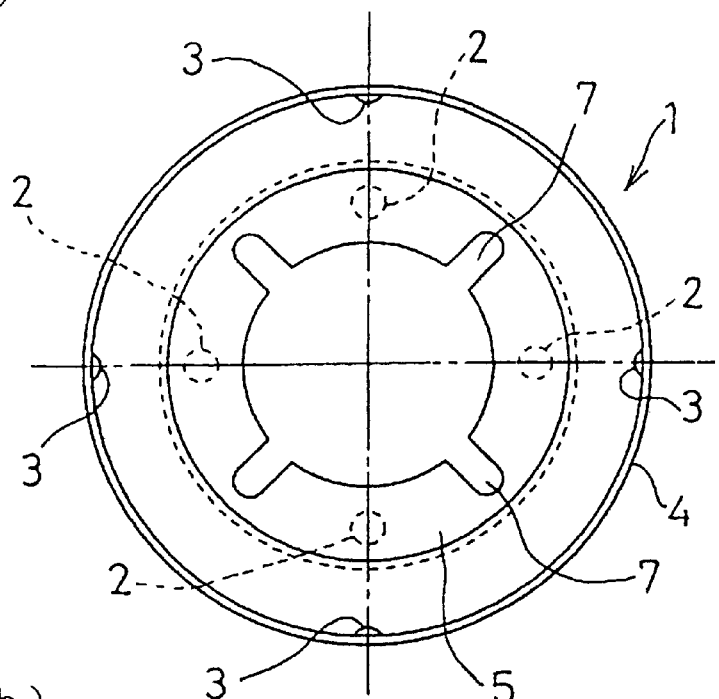
FIG. 2(a), FIG. 2(b), and FIG. 2(c) are plan view, side view, and perspective view, respectively, showing the constitution of the connector used in the connection structure of a battery according to an exemplary embodiment of the invention.
Figure 2B:
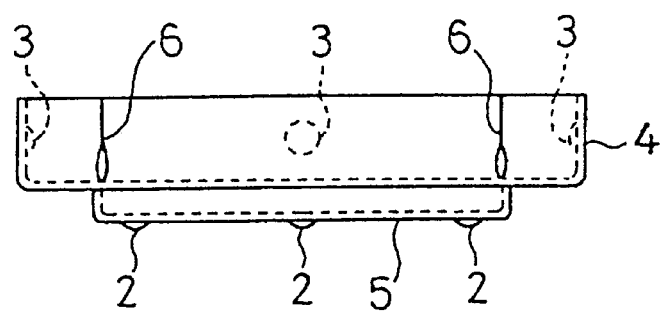
Figure 2C:
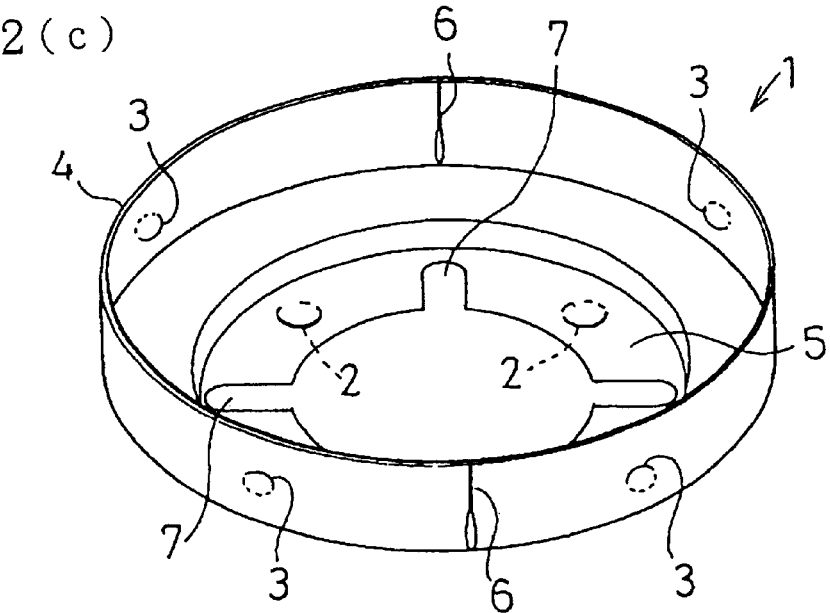

In FIG. 2(a), FIG. 2(b) and FIG. 2(c), the connector 1 has a cylindrical portion 4, and a flat portion 5 installed at one end of the cylindrical portion 4. That is, the connector 1 has a side wall 4, and a flat portion 5 orthogonal to the side wall. Plural second projections 3 are installed on the inner circumference of the cylindrical portion 4. Each one of the plural second projections 3 is installed on one circumference, and project toward the center of the cylindrical portion 4. Plural first projections 2 are installed on the outer surface of the flat portion 5. Each one of the plural first projections 2 is installed on one circumference.

The connector 1 is formed of conductive and weldable metal. At the inside of the cylindrical portion 4 of the connector 1, the second cell 100B is installed. The plural second projections 3 formed on the cylindrical portion 4 abut against the outer surface of the metal casing 11 of the second cell 100B, and the second projections 3 and metal casing 11 compose a second contact portion. At the outer side of the flat portion 5 of the connector 1, the first cell 100A is installed. The plural first projections 2 formed on the flat portion 5 abut against the outer surface of the metal electrode 10 of the first cell 100A, and the first projections 2 and metal electrode 10 compose a first contact portion. A slit 6 is formed in the cylindrical portion 4. A notch 7 is formed in the flat portion 5. This notch 7 has a function of decreasing the reactive current when welding the connector 1 and metal electrode 10. By this notch 7, the heat generation efficiency of the first contact portion is enhanced, so that welding may be done efficiently. The slit 6 formed in the connector 1 functions to give an elastic force for pressing the cylindrical portion 4 of the connector 1 in the direction of the metal casing 11 when the cylindrical portion 4 is fitted to the metal casing 11. By the elastic force of the connector 1, the contact force between the plural second projections 3 formed in the connector 1 and the metal casing 11 of the second cell 100B is increased. As a result, the heat generation efficiency of the second contact portion is enhanced, so that welding may be done efficiently. Thus, the connection structure of first cell 100A and second cell 100B is composed.

A connection method of the first cell 100A and second cell 100B is described below. First, the outer surface of the flat portion 5 of the connector 1 is welded to the metal electrode 10 of the first cell 100A. That is, the flat portion 5 is put on the metal electrode 10, and while pressing the flat portion 5 to the metal electrode 10 side, a welding current is applied between the connector 1 and metal electrode 10. At four positions of the plural first projections 2, the connector 1 is welded to the metal electrode 10. That is, the plural first projections 2 formed on the flat portion 5 and the metal electrode 10 contact each other. In this state of contact, when a current is applied between the connector 1 and metal electrode 10, heat is generated in the contact portion of the plural first projections 2 and metal electrode 10, and by this heat generation, each one of the plural first projections 2 and metal electrode 10 are welded at the same time.

In succession, the inside of the cylindrical portion 4 of the connector 1 welded to the metal electrode 10 of the first cell 100A is fitted to the metal casing 11 of the second cell 100B. At this time, the metal casing 11 and plural second projections 3 contact with one another. In this state of contact, when a welding current is applied between the metal casing 11 and the connector 1, the connector 1 and metal casing 11 are welded at the same time at four positions of the plural second projections 3.

Figure 3:
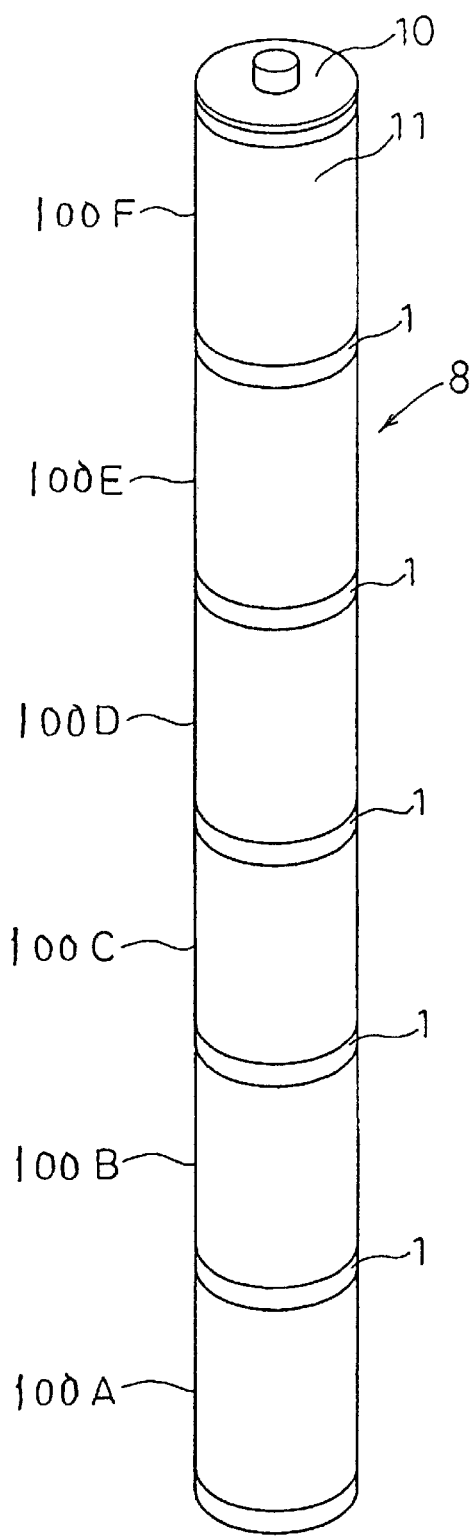
FIG. 3 is a perspective view showing a state of composing a storage battery module by coupling and connecting a plurality of cells in a connection structure of a battery according to a further exemplary embodiment of the invention.
Figure 4:
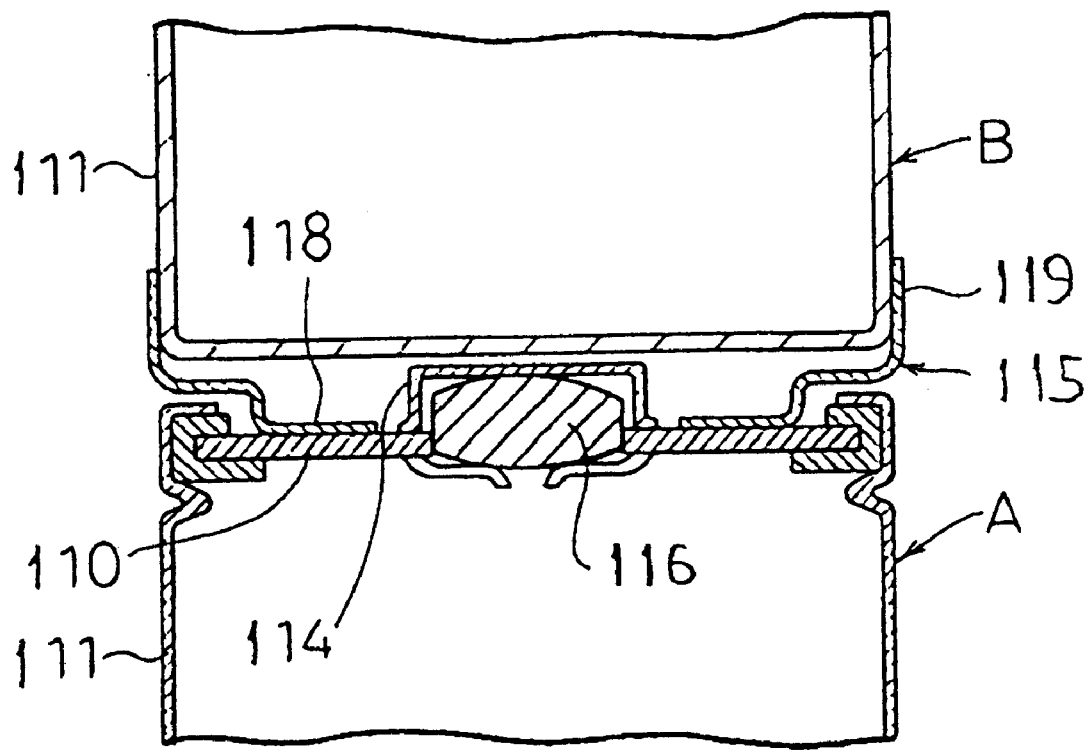
FIG. 4 is a sectional view showing a constitution of a connection structure of a conventional battery.
Figure 5A:
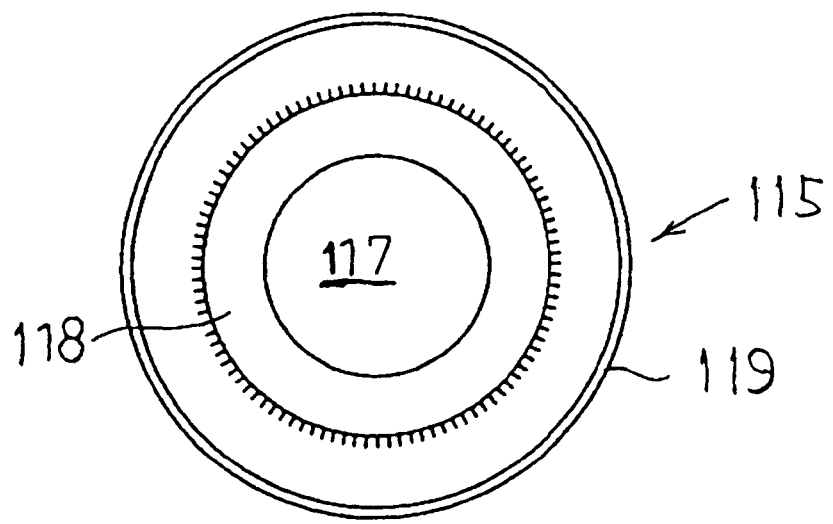
FIG. 5(a) and FIG. 5(b) are a plan view and side view, respectively, showing a constitution of the connector used in the connection structure of a conventional battery.
Figure 5B:
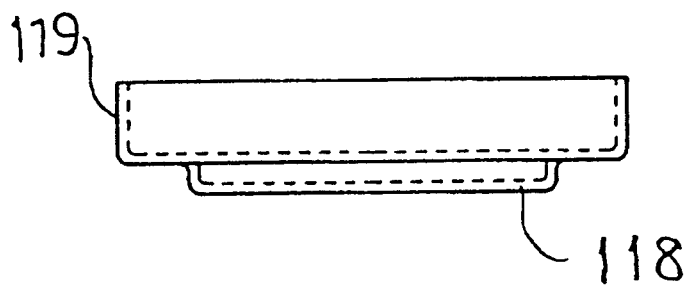

In this way, the first cell 100A and second cell 100B are connected in series by the connector 1. By repeating this connection of cells, for example, a storage battery module 8 having a series connection of third cell 100C, fourth cell 100D, fifth cell 100E, and sixth cell 100F as shown in FIG. 3 results.

Since the plural first projections 2 and plural second projections 3 formed on the connector 1 are formed on the same radius, the current path is the shortest distance when the first cell 100A and second cell 100B are connected. Accordingly, the electric power loss due to the specific resistance of the material for composing the connector 1 may be minimized. This electric power loss can also be lowered also by increasing the plate thickness of the connector 1. For example, according to the measurement, the resistance in the contact portion of the first projections 2 and metal electrode 10, or the contact portion of the second projections 3 and metal casing 11 was R=0.0681 mΩ at the plate thickness of t=0.18 mm, R=0.0409 mΩ at t=0.30, and R=0.0306 mΩ at t=0.40 mm. Thus, by increasing the plate thickness of the connector 1, it is possible to lower the specific resistance R of the contact portion, and therefore the storage battery module 8 having a small electric power loss is obtained. Furthermore, since the connector having a sufficient thickness can be used, the mechanical strength of the weld zone and coupling strength of the cells are enhanced.

As described herein, the constitution of the invention brings about the following effects.

(1) Since the connector having a sufficient thickness can be used, a battery module having a small electric power loss is obtained.

(2) Since the connection current path is short, the connection resistance is small, and hence a battery module having a small electric power loss can he obtained. In addition, the effect of the specific resistance of the connector on the electric power loss is decreased.

(3) Since the connector having a sufficient thickness can be used, the mechanical strength between connected cells is enhanced, so that a battery module resistant to external forces can be obtained.

What is claimed:

1. A connector for connecting in series a bottom portion of a first cell of a battery with a top portion of a second cell of the battery, said bottom portion of said first cell including a metal outer casing serving as a first electrode, said top portion of said second cell including a metal electrode located at one end of said second cell, said metal electrode having a first flat portion serving as a second electrode, wherein said connector comprises:
 a side wall,
 a second projection located on an inside surface of said side wall,
 a second flat portion orthogonal to said side wall, said second flat portion opposite to said first flat portion of said second cell, and
 a first projection on said second flat portion,
wherein said first projection abuts against said first flat portion of said second cell, and
 an inside portion of said side wall of said connector is fitted to an outside portion of said outer casing of said first cell, and said second projection of said connector abuts against a surface of said outer casing of said first cell.

2. A connector according to claim 1, wherein said outer casing has a cylindrical shape, and said connector has a cylindrical portion that can be fitted to the outside of said casing.

3. A connector according to claim 1, wherein said first projection is composed of a plurality of first projections, each one of said plurality of first projections is located in a circular pattern on said second flat portion.

4. A connector according to claim 1, wherein said second projection is composed of a plurality of second projections, each one of said plurality of second projections is located in a circular pattern centered on a center of said connector.

5. A connector according to claim 1, wherein said connector has a notch formed on said second flat portion.

6. A connector according to battery of claim 1, wherein said connector has a slit formed on said side wall.

7. A plurality of connectors for connecting in series a plurality of cells of a battery, each one of said plurality of cells having:
 a bottom portion including a metal outer casing serving as a first electrode, and
 a top portion including a metal electrode located at one end of said cell, said metal electrode having a first flat portion serving as a second electrode,
wherein each of said plurality of connectors comprises:
 a side wall,
 a second flat portion orthogonal to said side wall, said second flat portion opposite said first flat portion of a respective one of said plurality of cells,
 a first projection on said second flat portion, and
 a second projection on an inside surface of said side wall,
wherein said first projection of said plurality of connectors abuts against said first flat portion of said respective one of said plurality of cells, and
 an inside portion of said side wall of each one of said plurality of connectors is coupled to an outside portion of said metal casing of a further respective one of said plurality of cells, and said second projection of said plurality of connectors abuts against a surface of said metal casing of said further respective one of said plurality of cells.

8. A plurality of connectors according to claim 7, wherein said metal casing has a cylindrical shape, each one of said plurality of connectors has a cylindrical portion coupled to the outside portion of said casing of said respective one of said plurality of cells, and said side wall is a side wall of said cylindrical portion.

9. A plurality of connectors according to claim 7, wherein said first projection is a plurality of first projections, each one of said plurality of first projections formed in a circular pattern on said second flat portion, said second projection is composed of a plurality of second projections, and each one of said plurality of second projections is located in a further circular pattern centered on a center of said connector.

10. A plurality of connectors according to claim 7, wherein each of said plurality of connectors has a notch formed on said second flat portion, and a slit formed on said side wall.

* * * * *